(12) United States Patent
Zhang et al.

(10) Patent No.: US 10,993,224 B1
(45) Date of Patent: Apr. 27, 2021

(54) METHOD AND DEVICE FOR TRANSMITTING INFORMATION

(71) Applicant: ZTE Corporation, Shenzhen (CN)

(72) Inventors: Wen Zhang, Shenzhen (CN); Shuqiang Xia, Shenzhen (CN); Jing Shi, Shenzhen (CN); Xianghui Han, Shenzhen (CN); Chunli Liang, Shenzhen (CN); Zhisong Zuo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 246 days.

(21) Appl. No.: 16/300,606

(22) PCT Filed: May 12, 2017

(86) PCT No.: PCT/CN2017/084250
§ 371 (c)(1),
(2) Date: Sep. 9, 2019

(87) PCT Pub. No.: WO2017/194020
PCT Pub. Date: Nov. 16, 2017

(30) Foreign Application Priority Data

May 13, 2016 (CN) .......................... 201610323307.4
Jun. 28, 2016 (CN) .......................... 201610495377.8

(51) Int. Cl.
H04W 72/04 (2009.01)
H04L 5/00 (2006.01)
H04L 12/18 (2006.01)

(52) U.S. Cl.
CPC ....... H04W 72/0446 (2013.01); H04L 5/0048 (2013.01); H04L 12/189 (2013.01)

(58) Field of Classification Search
CPC . H04B 7/0456; H04B 7/0619; H04L 25/0228; H04L 5/00; H04L 5/0091; H04L 5/0048; H04L 12/189; H04W 72/0446
See application file for complete search history.

(56) References Cited

U.S. PATENT DOCUMENTS

| 2013/0163530 | A1 | 6/2013 | Chen |
| 2015/0078271 | A1 | 3/2015 | Kim |
| 2015/0117350 | A1* | 4/2015 | Seo ................. H04L 5/0048 370/329 |
| 2016/0227520 | A1* | 8/2016 | Davydov ............ H04L 25/0228 |

FOREIGN PATENT DOCUMENTS

CN 104812057 A 7/2015

OTHER PUBLICATIONS

"Discussion on DL RS for short TTI" 3GPP TSG RAN WG1 Meeting #84 R1-160293 St Julian's, Malta, Feb. 15-19, 2016.
(Continued)

*Primary Examiner* — Dady Chery
(74) *Attorney, Agent, or Firm* — Cantor Colburn LLP

(57) ABSTRACT

A method and device for transmitting information are provided, where the method includes that: according to a predetermined mode and/or eNB configuration mode, at least one of the following is determined: a Precoding Resource Block Group (PRG), a reference signal, and a frequency-domain resource allocation granularity; and information is transmitted in a Transmission Time Interval (TTI).

19 Claims, 9 Drawing Sheets

According to a predetermined mode and/or eNB configuration mode, at least one of a PRG, a reference signal, or a frequency-domain resource allocation granularity is determined — S102

Information is transmitted in a TTI — S104

(56) References Cited

OTHER PUBLICATIONS

"Overview of short TTI", 3GPP TSG RAN WG1 Meeting #84, R1-160291 St Julian's, Malta, Feb. 15-19, 2016.
"Uplink DMRS for PUSCH in short TTI", 3GPP TSG RAN WG1 Meeting #84, R1-160987 St Julian's, Malta, Feb. 15-19, 2016.
International Search Report for corresponding application PCT/CN2017/084250 filed May 12, 2017; dated Jun. 28, 2017.
3rd Generation Partnership Project, Technica Specification Group Radio Access Nework, 3GPP, vol. RAN WG1, Mar. 25, 2015, pp. 1-239, XP050928106.
European Search Report for corresponding application EP17795638.0; Report dated Apr. 4, 2019.
ZTE, "Discussion on test case for the PDSCH transmission in TM9", TGS RAN WG4 meeting #57AH, 3GPP, Jan. 11, 2011, XP050500281.

\* cited by examiner

METHOD AND DEVICE FOR TRANSMITTING INFORMATION

TECHNICAL FIELD

The present disclosure relates to the field of communications, and in particular to a method and device for transmitting information.

BACKGROUND

The rapid development of mobile Internet and Internet of Things causes explosive growth of data traffic and extensive rise of diversified and differentiated services. The 5G, as a new generation mobile communication technology, will support a higher rate (Gbps), high amounts of links (1M/Km2), an ultra-low delay (1 ms), higher reliability, and a hundredfold increase in energy efficiency compared to the 4G, so as to support a new requirement change. The ultra-low delay directly, as a key index of the 5G technology, directly influences the development of delay-constrained services, such as Internet of Vehicles, industrial automation, remote control, and smart grids. At present, a series of researches on standards of reducing a delay of the 5G are being advanced.

Reducing a Transmission Time Interval (TTI), as an important research direction of reducing a delay at present, is intended to reduce the existing TTI whose length is 1 ms to 0.5 ms or oven the length of 1-2 Orthogonal Frequency Division Multiplexing (OFDM) symbols, so that the minimum scheduling time is reduced exponentially, and a delay of single transmission may also be reduced exponentially without changing a frame structure. The 3GPP has also set up a project to discuss a technology of reducing a short TTI. In a short TTI technology, it is needed to reconsider both a Demodulation Reference Signal (DMRS) and a resource allocation granularity.

There is no effective solution yet aiming at a problem of unreasonable data transmission in the short TTI technology.

SUMMARY

The embodiments of the present disclosure provide a method and device for transmitting information, which may solve a problem of unreasonable data transmission in the short TTI technology.

According to an embodiment of the present disclosure, a method for transmitting information is provided, which includes that: according to a predetermined mode and/or eNB configuration mode, at least one of a Precoding Resource Block Group (PRG), a reference signal, or a frequency-domain resource allocation granularity is determined; and information is transmitted in a TTI.

According to another embodiment of the present disclosure, a device for transmitting information is provided, which includes: a determining module and a transmitting module.

The determining module is configured to determine, according to the predetermined mode and/or eNB configuration mode, at least one of the PRG, the reference signal, or the frequency-domain resource allocation granularity.

The transmitting module is configured to transmit information in the TTI.

According to yet another embodiment of the present disclosure, a storage medium is provided. The storage medium is configured to store a program code for performing the following steps: according to the predetermined mode and/or eNB configuration mode, at least one of the PRG, the reference signal, or the frequency-domain resource allocation granularity is determined; and information is transmitted in the TTI.

Through the present disclosure, which includes that: at least one of the PRG, the reference signal, or the frequency-domain resource allocation granularity is determined according to the predetermined mode and/or through an indication of the eNB, and information is transmitted in a short TTI according to the above determined information, a problem in the short TTI technology of unreasonable data transmission caused by unreasonable setting of related parameters is solved, thereby reasonably transmitting data in case of using the short TTI technology.

BRIEF DESCRIPTION OF THE DRAWINGS

The accompanying drawings described here are used for providing further understanding of the present disclosure, and constitute a part of the present application. Schematic embodiments of the present disclosure and description thereof are used for illustrating the present disclosure and not intended to form an improper limit to the present disclosure. In the accompanying drawings.

DETAILED DESCRIPTION OF THE EMBODIMENTS

The present disclosure is elaborated below with reference to the accompanying drawings and embodiments. It is to be noted that the embodiments and the features in the embodiments of the present application may be combined with each other under the condition of no conflicts.

It is to be noted that the specification and claims of the present disclosure, and the terms like "first" and "second" in the accompanying drawings are used for differentiating the similar objects, but do not have to describe a specific order or a sequence.

First Embodiment

Figure 1:
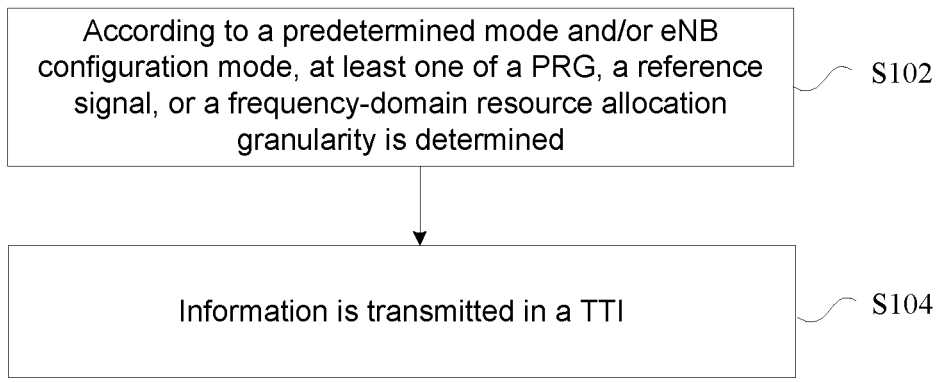
FIG. 1 is a flowchart of the method for transmitting information according to an embodiment of the present disclosure.

The embodiments of the present application provide a mobile communication network (including, but not limited to, the 5G mobile communication network). A network architecture of the network may include a network side device (for example, an eNB) and a terminal. The present embodiment provides a method for transmitting information, which may be run on the network architecture. It is to be noted that the running environment of the information transmission method provided by the present embodiment of the present application is not limited to the network architecture. FIG. 1 is a flowchart of the information transmission method according to the present embodiment of the present disclosure. As shown in FIG. 1, the flow includes the following steps.

At S102, according to a predetermined mode and/or eNB configuration mode, at least one of a PRG; a reference signal, or a frequency-domain resource allocation granularity is determined. In an exemplary embodiment, modes of indicating the PRG according to the eNB include one of the following: configuring through an SIB, configuring through RRC signaling, and configuring through DCI.

At S104, information is transmitted in a TTI.

The method presented in the above embodiment is used for transmission in a short TTI. The short TTI in the present embodiment may be a TTI not greater than 7 symbols. The presented method is applied, but not limited, to a short TTI system. The present embodiment is elaborated by taking downlink for example. The presented method may be applied to either downlink or uplink.

An eNB and a piece of UE determine a value of the PRG, and then the eNB transmits a Physical Downlink Shared Channel (PDSCH) to the UE according to the value of the PRG The PRG is composed of a number of PRBs. In a PRG, precoding matrixes used for transmission are the same.

In an exemplary embodiment, two modes of determining the PRG are given below.

In the first mode, for a given length of the TTI, the value of the PRG may be a fixed value, for example, 4. The value of the PRG has nothing to do with a system bandwidth. Preferably, the PRG is one of 2, 3, 4 and 6, or an integral multiple of these values, namely one of factors, except 1, of 12. If the number of the PRBs corresponding to the system bandwidth is N, and N mod P>0, the size of a PRG is N−P⌊N/P⌋, where the P is the size of the PRG, namely P PRBs, "mod" means a modulo operation, ⌊•⌋ means rounding down. The PRGs are divided from the lowest frequency. The size of the PRG does not increase, that is, the PRG with the highest frequency has the minimum size.

In an exemplary embodiment, the PRGs may also be divided from the highest frequency. For example, for the system bandwidth of 20 MHz, if the corresponding number of the PRBs is 100, and the size of the PRG is 6, then the size of the last PRG is 4. This dividing mode may be applied to all the embodiments of the present disclosure. In the present embodiment, if the value of the PRG is n, it means that the PRG is n PRBs. In an exemplary embodiment, the length of all the short TTIs corresponds to the same size of the PRG In an exemplary embodiment, the PRGs may also be divided in frequency-domain resources allocated to the UE. In the frequency-domain resources allocated to the UE, starting from an initial PRB, every m PRBs are one PRG For example, if the resources allocated to the UE are the PRBs #2-9, and the value of the PRG is 4 PRBs, then the PRBs from No. 2 to No. 5 are one PRG, and PRBs from No. 6 to No. 9 are another PRG The m is preset or configured by the eNB.

In an exemplary embodiment, the PRGs may also be divided in a span of frequency-domain resource allocated to the UE. In the span of frequency-domain resource allocated to the UE, starting from the initial PRB, every m PRBs are one PRG Here, the span of frequency-domain resource is the total number of the PRBs from the PRB with the lowest frequency to the PRB with the highest frequency which are allocated to the UE. When the resources allocated to the UE are continuous, the frequency-domain resources and the span of frequency-domain resource are the same. When the resources allocated to the UE are discrete, the frequency-domain resources and the span of frequency-domain resource are different. For example, when the frequency-domain resources allocated to the UE are the PRBs No. 1, No. 4 and No. 8, the span of frequency-domain resource is 8; and in the span of frequency-domain resource, the PRBs from No. 1 to No. 4 are one PRG, and the PRBs from No. 5 to No. 8 are one PRG In the second mode, the PRGs belong to a set of PRGs. The set includes n values of the PRG, herein the n is a positive integer greater than 1. In the n values of the PRG, each value of the PRG is a multiple of the minimum value of the PRG in the set. For example, the set of PRGs includes three values of the PRG, which are respectively 3, 6 and 9, namely 3 PRBs, 6 PRBs and 9 PRBs. In an exemplary embodiment, the set is the same for all the system bandwidths.

In an exemplary embodiment, the value of the PRG in the set of PRGs or the minimum value of the PRG in the set of PRGs is one of the factors, except 1, of 12, or an integral multiple of one of the factors, except 1, of 12.

In an exemplary embodiment, the set of PRGs is preset. For example, the transmission of all the short TTIs corresponds to a set of PRGs, or each length of the TTI corresponds to a set of PRGs; the set corresponding to each length of the TTI may be the same or different. In an exemplary embodiment, the set of PRGs is notified by the eNB. For example, the set of PRGs is notified to the UE in the SIB, or notified to a user terminal or the UE in the RRC signaling. In an exemplary embodiment, the PRG used for transmission is preset, for example, the PRG is determined according to the system bandwidth. For example, if the set of PRGs is {4, 8}, then the PRG under 10 MHz is 4, and the PRG above 10 MHz is 8. Or, the PRG is determined according to the length of the TTI. For example, when the length of the TTI is less than or equal to 4, the PRG is 8; and when the length of the TTI is greater than 4, the PRG is 4. In an exemplary embodiment, the PRG used for transmission is notified by the eNB, for example, the PRG is notified by the eNB through the RRC signaling. For example, if the eNB notifies the UE that the PRG is 4, then the adopted PRG is 4 in the subsequent transmission. Or, the PRG may also be notified through the DCI to indicate the PRG used for the transmission of this time. In an exemplary embodiment, a bandwidth fed back by a CSI is an integral multiple of the number of the PRBs included in the PRG In an exemplary embodiment, the bandwidth fed back by the CSI is preset, for example, it is equal to the PRG Or, the bandwidth fed back by the CSI is notified by the eNB, for example, the eNB notifies the UE of the multiple of the bandwidth fed back by the CSI relative to the PRG It is concluded from the above two modes of determining the PRG that the numbers of the PRBs corresponding to the PRG belong to a set, and each element in the set is equal to an integral multiple of the minimum value in the set. The numbers of the PRBs corresponding to the PRG (also called the minimum value in the set) are one of the following: any one of 2, 3, 4 and 6; and a multiple of the number of the PRBs corresponding to a RBG in a system.

In an alternative embodiment of the present disclosure, the number of the PRBs corresponding to the frequency-domain resource allocation granularity is one of the following: an integral multiple of the number of the PRBs corresponding to the PRG, an integral multiple of a common multiple of the number of the PRBs corresponding to the PRG and the number of the PRBs corresponding to the RBG in the system, an integral multiple of the minimum value in the set, and an integral multiple of the common multiple of the minimum value in the set and the number of the PRBs corresponding to the RBG in the system.

In the above embodiment, the eNB schedules the UE to perform transmission. The resources for the UE to perform transmission are an integral multiple of the resource allocation granularity, herein the resource allocation granularity is the frequency-domain resource allocation granularity. In an exemplary embodiment, the resource allocation granularity is determined by the PRG, for example, an integral multiple number of PRGs. Here, the PRG may be a preset value or a value which is configured to the UE by the eNB; or, for the set of PRGs in the first embodiment, the PRG may be the minimum value of the PRG in the set of PRGs, that is, the resource allocation granularity is an integral multiple of the minimum value of the PRG in the set of PRGs. In an exemplary embodiment, the resource allocation granularity is determined by the PRG and the RBG The PRG here may be a preset value, or a value which is configured to the UE by the eNB, or the minimum value of the PRG in the set of PRGs. In an exemplary embodiment, the resource allocation granularity may be an integral multiple of the common multiple of the PRG and the RBG For example, for the system bandwidth of 10 MHz, if the PRG is two PRBs, and the size of the RBG is three PRBs, the resource allocation granularity is six PRBs. Because the system bandwidth of 10 MHz is not an integral multiple of 6, the last resource allocation granularity, namely the resource allocation granularity with the highest frequency is 50 mod 6=2. In an exemplary embodiment, for a given TTI, the resource allocation granularity is a fixed value for all the system bandwidths. In an exemplary embodiment, the resource allocation granularities corresponding to all the short TTIs are the same. In an exemplary embodiment, the resource allocation granularity increases with the increase of the system bandwidth. In an exemplary embodiment, the bandwidth fed back by the CSI is an integral multiple of the number of the PRBs included in the resource allocation granularity.

In an alternative embodiment of the present disclosure, a design method of the reference signal is provided. The present embodiment is elaborated by taking the DMRS for example, and the presented method is applied, but not limited, to the DMRS.

In the present embodiment, the DMRS is designed in a group of continuous PRBs. The patterns in the continuous PRBs will be introduced below, for example, the patterns are uniformly distributed in three PRBs. It is assumed that the number of the continuous PRBs is m. The value of the m may be the number of PRBs corresponding to the PRG in the system, or the minimum value in the set of PRGs, or the number of the PRBs corresponding to the RBG in the system, or the preset value, or the value configured by the eNB, or the number N of the PRBs corresponding to the span of frequency-domain resource for transmitting the information. Here, the span of frequency-domain resource is the total number of the PRBs from the PRB with the lowest frequency to the PRB with the highest frequency which are allocated to the UE. For example, if the PRBs allocated to the UE are the PRBs from No. 1 to No. 6, the m is equal to 6; or, if the PRBs allocated to the UE are the PRBs No. 1, No. 4 and No. 8, the m is equal to 8. Or, the n may also be equal to $\lfloor N/k \rfloor$, where the k is a positive integer which is preset or configured by the eNB.

In an exemplary embodiment, the DMRS is designed in a group of continuous PRBs. The number of the PRBs corresponding to the group of continuous PRBs may be preset or notified by the eNB. Preferably, the DMRS is designed in the PRG or in the minimum PRG in the set of PRGs. For example, if the minimum PRG is two PRBs, the DMRS is designed in two PRBs. Or, the DMRS may also be designed in the resources allocated to the UE. For example, if the resources allocated to the UE by the eNB are the PRBs from No. 3 to No. 10, then the DMRS is designed in the eight PRBs according to the pattern introduced below; or the DMRS is designed, according to the pattern introduced below, in the PRBs from No. 3 to No. 6, or in the PRBs from No. 7 to No. 10. In the description below, the DMRS pattern is given by taking that the DMRS is designed in the PRG for example. In practical applications, the DMRS is not limited to being designed in the PRG On an OFDM symbol where the reference signal is, in the PRG, for each layer of reference signal, one in every n REs is the reference signal, herein the n is an integral multiple of 3. In an exemplary embodiment, on the OFDM symbol where the reference signal is, and in the PRB, the DMRS occupies at least one of the following: the RE with the lowest frequency in the PRG, or the RE with the lowest frequency, except the RE where the CRS is, in the PRG; the RE with the highest frequency in the PRG, or the RE with the highest frequency, except the RE where the CRS is, in the PRG On the symbol where the DMRS is, the DMRSs are distributed at regular intervals in the PRG That is, on a PRG, for each layer of DMRS, one in every x REs is the RE corresponding to the DMRS, herein the x is a multiple of 3, such as 3, 6, and 9, as shown in the accompanying drawings from FIG. 2 to FIG. 4.

In the accompanying drawings from FIG. 2 to FIG. 10, each square represents an RE, the black square represents the RE of the CRS, the square filled with diagonals and the square filled with lattices represent the transmitted reference signals.

Figure 2:
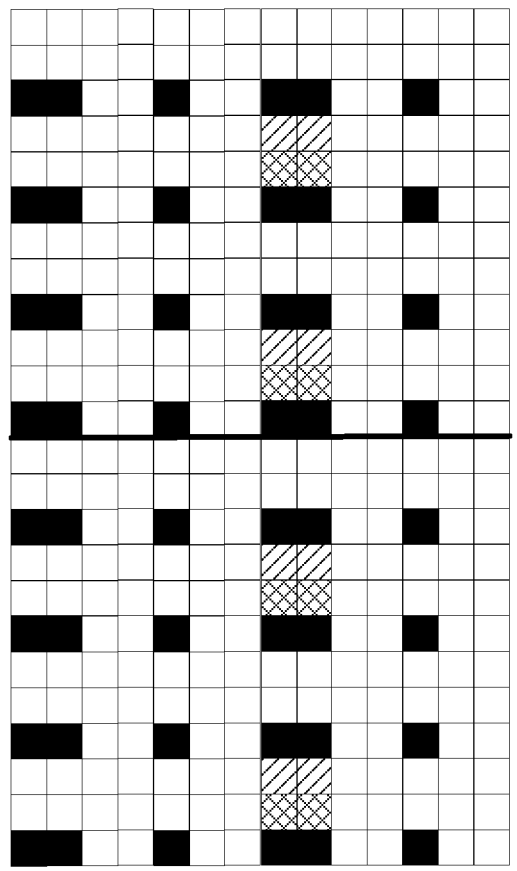
FIG. 2 is a first DMRS pattern when a TTI is composed of the eighth symbol and the ninth symbol in a sub-frame according to an alternative embodiment of the present disclosure.

FIG. 2 is a first DMRS pattern when a TTI is composed of the eighth symbol and the ninth symbol in a sub-frame according to an alternative embodiment of the present disclosure. FIG. 2 shows the DMRS pattern when a cell identity module 3 is 0. The pattern on the frequency domain may also be applied to other length and position of the TTI. For example, when the length of the TTI is three symbols, the DMRS may be on the first two symbols.

Figure 3:
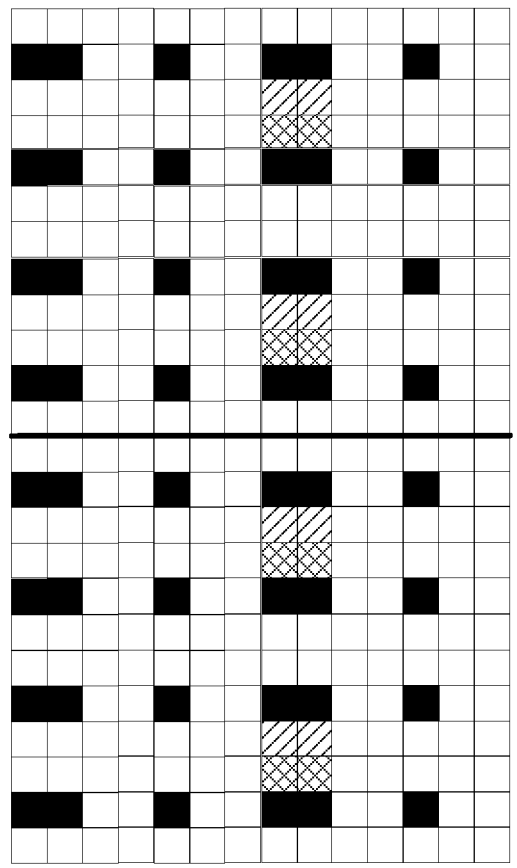
FIG. 3 is a second DMRS pattern when the TTI is composed of the eighth symbol and the ninth symbol in a sub-frame according to an alternative embodiment of the present disclosure.

FIG. 3 is a first DMRS pattern when a TTI is composed of the eighth symbol and the ninth symbol in a sub-frame according to an alternative embodiment of the present disclosure. FIG. 3 shows the DMRS pattern when the cell identity module 3 is 1. The pattern on the frequency domain may also be applied to other length and position of the TTI.

Figure 4:
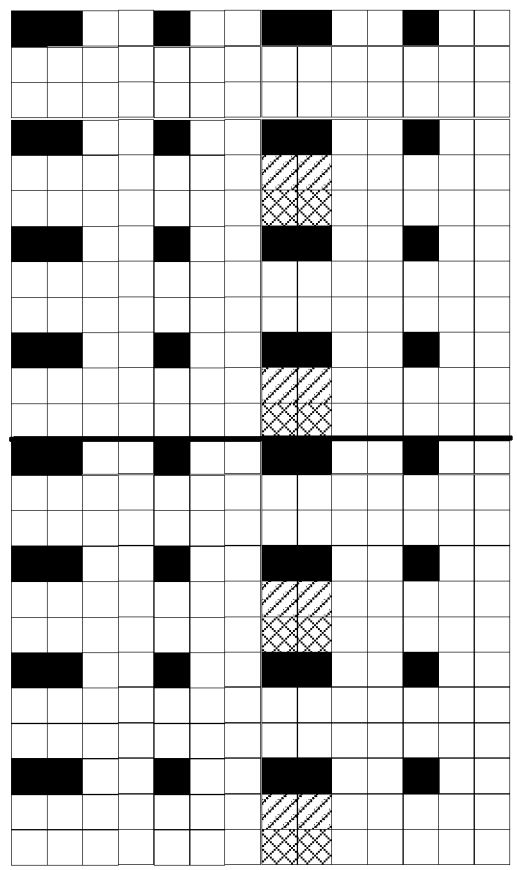
FIG. 4 is a third DMRS pattern when the TTI is composed of the eighth symbol and the ninth symbol in a sub-frame according to an alternative embodiment of the present disclosure.

FIG. 4 is a third DMRS pattern when the TTI is composed of the eighth symbol and the ninth symbol in a sub-frame according to an alternative embodiment of the present disclosure. FIG. 4 shows the DMRS pattern when the cell identity module 3 is 2. The pattern on the frequency domain may also be applied to other length and position of the TTI.

In the accompanying drawings from FIG. 2 to FIG. 4, the PRG is two PRBs, and the DMRSs are uniformly distributed in the PRG Each square represents an RE. Corresponding to a related art in the field, the part of diagonals corresponds to two layers of DMRS, and a Code Division Multiplexing (CDM) technology is adopted between the two layers of DMRS; the part of squares corresponds to another two layers of DMRS, and the CDM technology is adopted between the two layers DMRS. There are four layers of DMRS transmitted, and the density of each layer of DMRS on the frequency domain is that one in every six REs is applied to the DMRS. The pattern may also be applied to other length and position of the TTI. For example, when the length of the TTI is three symbols, the DMRS may be on the first two symbols. In an exemplary embodiment, in one PRG, if the cell identity module 3 is 0, the RE with the lowest frequency corresponding to the DMRS is the second RE according to an ascending order of frequencies in the PRG; if the cell identity module 3 is 1, the RE with the lowest frequency corresponding to the DMRS is the third RE according to an ascending order of frequencies in the PRG; if the cell identity module 3 is 0, the RE with the lowest frequency corresponding to the DMRS is the first RE according to an ascending order of frequencies in the PRG In an exemplary embodiment, the intervals of different layers of DMRS may be different. For example, one layer of DMRS is that one in every six REs is the RE of the DMRS; another layer of DMRS is that one in every nine REs is the RE of the DMRS.

Figure 5:
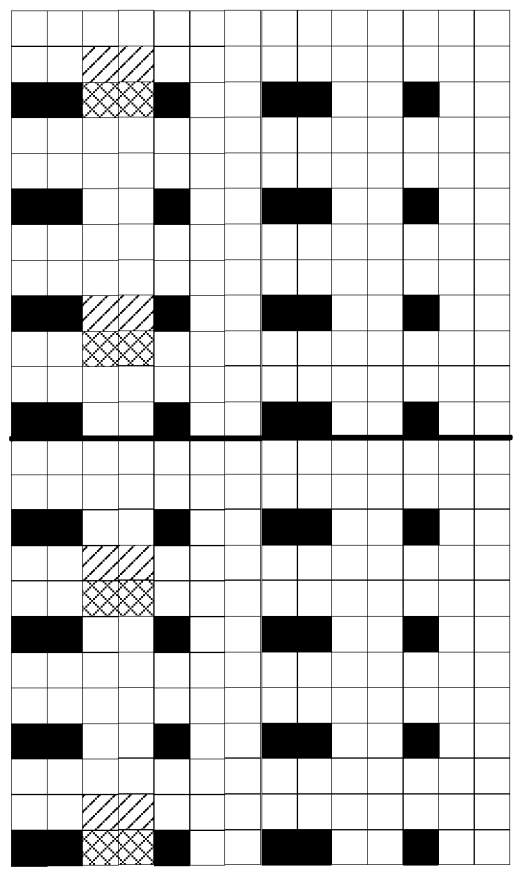
FIG. 5 is a fourth DMRS pattern on a frequency domain of the TTI according to an alternative embodiment of the present disclosure.

In an exemplary embodiment, on the symbol where the DMRS is, the DMRSs are distributed at regular intervals in the PRG On one PRG, for each layer of DMRS, one in every x REs is the RE corresponding to the DMRS, here $$x = \left\lfloor \frac{12m-2}{n-1} \right\rfloor,$$

where the m and the n are positive integers, and the function $\lfloor \ \rfloor$ means rounding down. Here, "one in every x REs is the RE corresponding to the DMRS" may be understood as one in any x continuous REs on the frequency domain is the RE corresponding to the DMRS. The m may be regarded as the number of the PRBs included in the PRG, and the n is the number of the REs corresponding to each layer of DMRS on the symbol in one PRG In an exemplary embodiment, on the symbol where the DMRS is, the DMRSs are distributed at regular intervals in the PRG On one PRG, for each layer of DMRS, one in every x REs is the RE corresponding to the DMRS, here $$x = \left\lfloor \frac{12m-1}{n-1} \right\rfloor,$$

where the m and the n are positive integers. The m may be regarded as the number of the PRBs included in the PRG, and the n is the number of the REs corresponding to each layer of DMRS on the symbol in one PRG FIG. 5 is a fourth DMRS pattern on a frequency domain of the TTI according to an alternative embodiment of the present disclosure. Being similar to the accompanying drawings from FIG. 2 to FIG. 4, the part of diagonals and the part of squares represent the DMRS. For example, as shown in FIG. 5, if the number of the PRBs included in the PRG is 2, that is, the m is equal to 2, and the number of the REs corresponding to each layer of DMRS on the symbol in one PRG is 4, that is, the n is equal to 4, then the x is equal to 7. It can be seen that for each layer of DMRS, only one in any continuous 7 REs on the frequency domain is the RE transmitting the DMRS.

Figure 6:
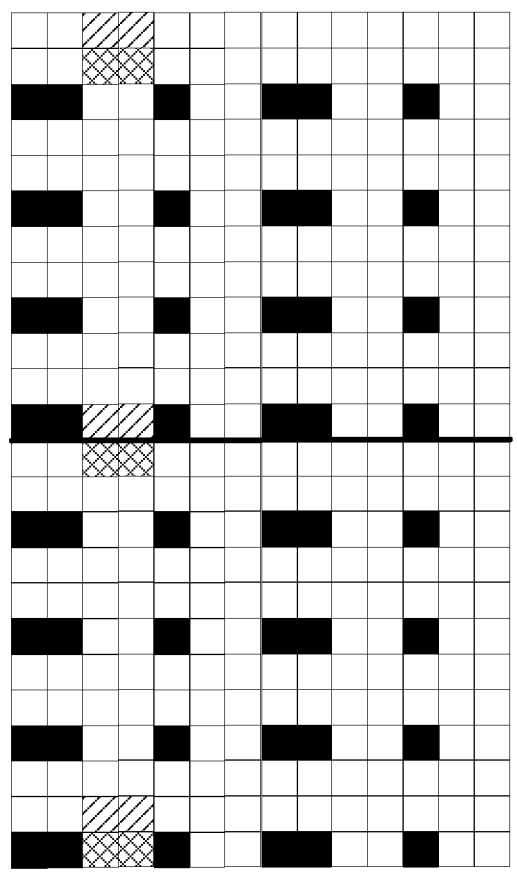
FIG. 6 is a fifth DMRS pattern on a frequency domain of the TTI according to an alternative embodiment of the present disclosure.
Figure 7:
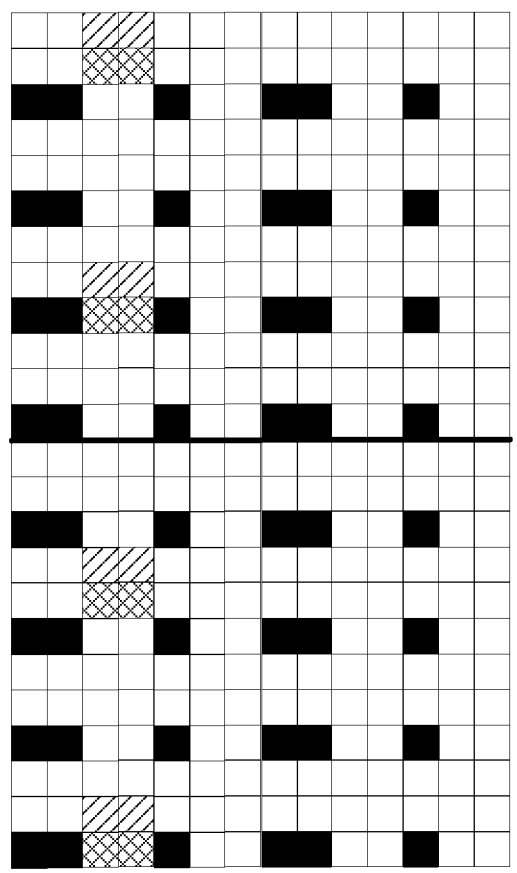
FIG. 7 is a sixth DMRS pattern on a frequency domain of the TTI according to an alternative embodiment of the present disclosure.
Figure 8:
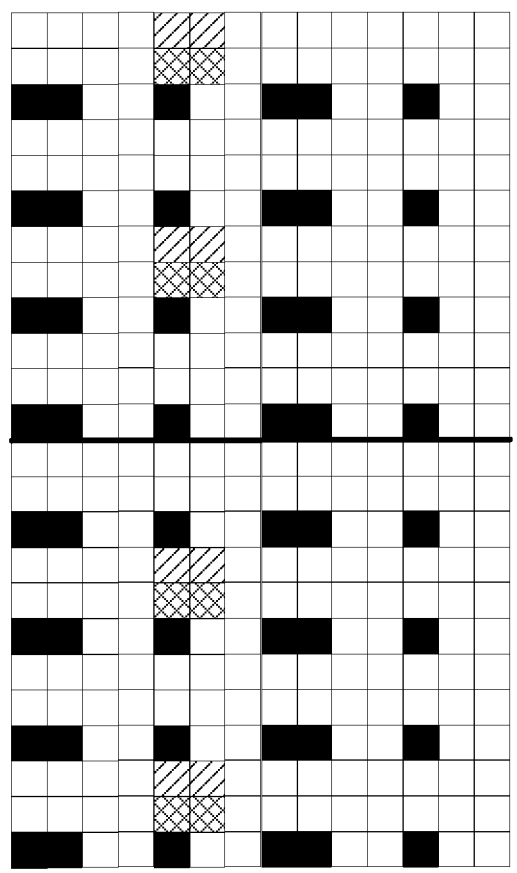
FIG. 8 is a seventh DMRS pattern on a frequency domain of the TTI according to an alternative embodiment of the present disclosure.

FIG. 6 is a fifth DMRS pattern on a frequency domain of the TTI according to an alternative embodiment of the present disclosure. Being similar to the accompanying drawings from FIG. 2 to FIG. 4, the part of diagonals and the part of squares represent the DMRS. As shown in FIG. 6, if the number of the PRBs included in the PRG is 2, that is, the m is equal to 2, and the number of the REs corresponding to each layer of DMRS on the symbol in one PRG is 3, that is, the n is equal to 4, then the x is equal to 11. It can be seen that the DMRSs of each layer are uniformly distributed on the PRG, and get close enough to the edge of the PRG Or, on the symbol where the DMRS is, the DMRS with the lowest frequency and the DMRS with the highest frequency are respectively at two ends of the PRG, namely the RE with the lowest frequency in the PRG, or the RE with the lowest frequency except the RE where the CRS is, and the RE with the highest frequency in the PRG or the RE with the highest frequency except the RE where the CRS is. The other REs of the DMRS are distributed on the PRG as uniformly as possible. FIG. 7 is a sixth DMRS pattern on a frequency domain of the TTI according to an alternative embodiment of the present disclosure. Being similar to the accompanying drawings from FIG. 2 to FIG. 4, the part of diagonals and the part of squares represent the DMRS. FIG. 8 is a seventh DMRS pattern on a frequency domain of the TTI according to an alternative embodiment of the present disclosure. Being similar to the accompanying drawings from FIG. 2 to FIG. 4, the part of diagonals and the part of squares represent the DMRS.

The above is the design of transmission patterns of the DMRS on the frequency domain. The design of transmission patterns of the DMRS on a time domain is given below. In the accompanying drawings from FIG. 9 to FIG. 11, it is a PRB in the conventional art; a conventional CP is adopted; the horizontal axis represents the symbol, and there are 14 OFDM symbols; the vertical axis represents a subcarrier, and there are 12 subcarriers; each square represents an RE, and the square with R represents the RE of the CRS.

Figure 9:
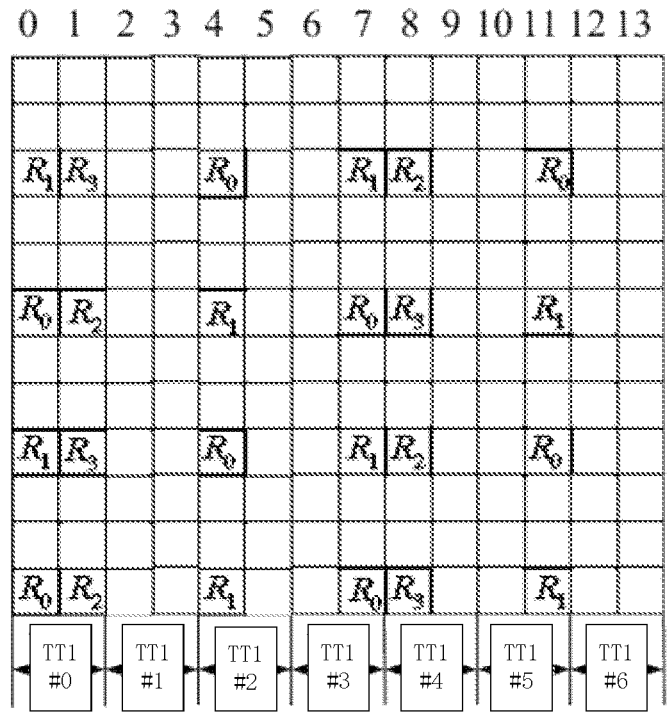
FIG. 9 is a first DMRS pattern on a time domain of the TTI according to an alternative embodiment of the present disclosure.

In an exemplary embodiment, the reference signal is only allowed to be transmitted in the specified TTI. Preferably, for the TTI whose length is two symbols, and for the conventional CP, for example, the reference signal is transmitted on the TTI #1 and the TTI #6 in FIG. 9. FIG. 9 is a first DMRS pattern on a time domain of the TTI according to an alternative embodiment of the present disclosure. As shown in FIG. 9, two symbols on each TTI are occupied. The pattern on the frequency domain may be according to the above mode. The pattern on the frequency domain may also be other mode, being not limited to the modes presented in the present embodiment. If the eNB configures for the UE that the DMRS is adopted for demodulation, when the UE is scheduled on the TTIs #1-5 of a sub-frame, the UE receives the DMRS in the TTI #1 of this sub-frame. When the UE is scheduled on the TTI #6 or the TTI #1 of the next sub-frame, the UE receives the DMRS in the TTI #6 of this sub-frame. For the DCI, the situation is similar.

Figure 10:
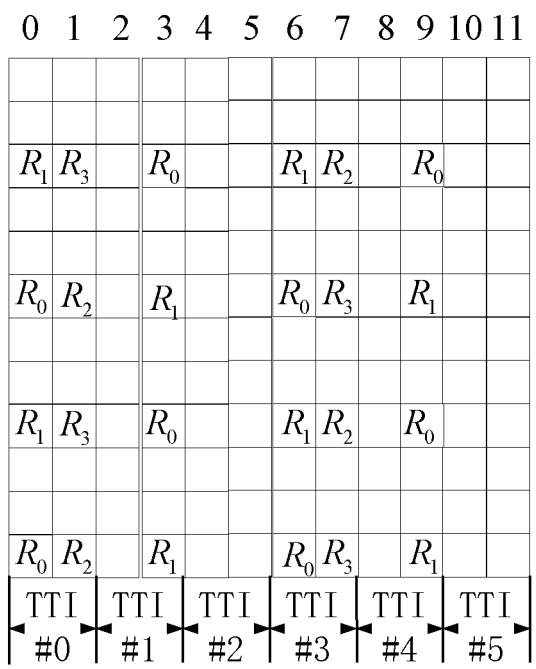
FIG. 10 is a second DMRS pattern on a time domain of the TTI according to an alternative embodiment of the present disclosure.

For an extended CP, for example, the reference signal is transmitted on the TTI #2 and the TTI #5 in FIG. 10. FIG. 10 is a second DMRS pattern on a time domain of the TTI according to an alternative embodiment of the present disclosure;

In an exemplary embodiment, the specified TTI is the odd-numbered sub-frames or the even-numbered sub-frames. Or, the specified TTI satisfies $n_{TTI}$ mod a=b, where $n_{TTI}$ is the TTI index, the a is a positive integer greater than 1, and the b is a nonnegative integer. The TTI index may be the index in a sub-frame, for example, 0-6 in FIG. 9, or the index in a radio frame, for example, 0-69, or the index in a preset number of sub-frames, for example, two sub-frames. In practical applications, the index is not limited to the above examples.

In an exemplary embodiment, the specified TTI may be the TTI in the MBSFN sub-frame.

In an exemplary embodiment, in the specified TTIs should not include these TTIs only composed of PDCCH symbols, for example, the PDCCH is transmitted on the first two symbols of a sub-frame, if the first two symbols of a sub-frame form a TTI, then the DMRS is not transmitted on the TTI.

Figures 11, 12:
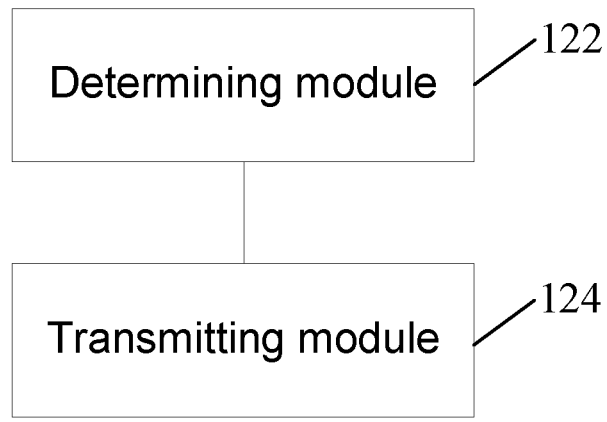
FIG. 11 is a third DMRS pattern on a time domain of the TTI according to an alternative embodiment of the present disclosure.
FIG. 12 is a structure diagram of the device for transmitting information according to an alternative embodiment of the present disclosure.

In an exemplary embodiment, the DMRS is only allowed to be transmitted on the symbols without the CRS in the specified TTI. Here, the CRS is the one when the number of ports is 4; for example, for the conventional CP, the symbols without the CRS are the third symbol, the fourth symbol, the sixth symbol and the seventh symbol of each time slot. Or, the CRS here may also be the one transmitted in the actual system; for example, for the conventional CP, if the number of ports in the actual system is 2, then the symbols without the CRS are the second symbol, the third symbol, the fourth symbol, the sixth symbol and the seventh symbol of each time slot. For example, the reference signal is transmitted on the TTI #0 and the TTI #4 in FIG. 9. When the reference signal is transmitted on the TTI #0, it is transmitted on two symbols; when the reference signal is transmitted on the TTI #4, it is only transmitted on the second symbol, namely the symbol #9. On the symbol #9, the pattern on the frequency domain may be according to the above mode. The pattern on the frequency domain may also be other mode, being not limited to the modes presented in the present embodiment. On the TTI #4, the reference signal is only transmitted on the symbol #9, for the pattern on the frequency domain in FIG. 8, OCC, between two symbols, of the DMRS may not be realized, that is, the CDM of two layers of DMRS may not be implemented, so only two layers of DMRS of Frequency Division Multiplexing (FDM) may be supported. For example, FIG. 11 is a third DMRS pattern on a time domain of the TTI according to an alternative embodiment of the present disclosure. In FIG. 11, a sub-frame is divided into four TTIs. the DMRS is transmitted on the TTIs #1 and #3 in FIG. 11, and is transmitted on the last two symbols of each CRS on the TTIs #1 and #3.

In an exemplary embodiment, when the length of the TTI is 2, for the conventional CP, the TTI of transmitting the DMRS is one of following: the TTIs #1 and #3, the TTIs #1 and #4, the TTIs #1 and #5, the TTIs #2 and #4, the TTIs #2 and #5, the TTIs #3 and #5, the TTIs #3 and #6, the TTIs #4 and #6, the TTIs #1, #3 and #5, the TTI #1, 4 and 6, and the TTI #2, 4 and 6; herein, in a sub-frame, every two symbols form one TTI, and the TTI indexes in a sub-frame are respectively 0, 1, 2, 3, 4, 5 and 6 according to a time sequence.

In an exemplary embodiment, when the length of the TTI is 2, for an non-MBSFN sub-frame of an extended CP, or an MBSFN sub-frame, the TTI of transmitting the DMRS is one of the following: the TTIs #1 and #3, the TTIs #1 and #4, the TTIs #1 and #5, the TTIs #2 and #4, the TTIs #2 and #5, the TTIs #3 and #5, and the TTIs #1, #3 and #5; herein, in a sub-frame, every two symbols form one TTI, and the TTI indexes in a sub-frame are respectively 0, 1, 2, 3, 4 and 5 according to a time sequence.

In an exemplary embodiment, when the length of the TTI is 4 or 3, for the conventional CP, the TTI of transmitting the DMRS is one of the following: the TTIs #1 and #3, the TTIs #0 and #2, and the TTIs #2 and #3; herein, in each time slot of a sub-frame, the first four symbols are one TTI, and the last three symbols are one TTI; or the first three symbols are one TTI, and the last four symbols are one TTI; the TTI indexes in a sub-frame are respectively 0, 1, 2 and 3 according to a time sequence.

In an exemplary embodiment, when the length of the TTI is 3, for the non-MBSFN sub-frame of the extended CP, or the MBSFN sub-frame, the TTI of transmitting the DMRS is one of the following: the TTIs #1 and #3, the TTIs #0 and #2, and the TTIs #2 and #3; herein, in a sub-frame, every three symbols form one TTI, and the TTI indexes in a sub-frame are respectively 0, 1, 2 and 3 according to a time sequence.

In an exemplary embodiment, when the length of the TTI is 4, for the non-MBSFN sub-frame of the extended CP, or the MBSFN sub-frame, the TTI of transmitting the DMRS is one of the following: the TTIs #1 and #2, the TTI #1, and the TTI #2; herein, in a sub-frame, every four symbols form one TTI, and the TTI indexes in a sub-frame are respectively 0, 1, and 2 according to a time sequence.

In an exemplary embodiment, the DMRS corresponding to the information on the current TTI of transmitting information is transmitted on the TTI of transmitting the DMRS which is before the TTI (it is to be noted that the TTI is included) and closest to the TTI, that is, the UE may use the DMRS on the closest TTI of transmitting the DMRS before the TTI for transmission to perform demodulation. For example, when the length of the TTI is 2, for the conventional CP, the TTIs of transmitting the DMRS are the TTIs #1 and #4. In a sub-frame, every two symbols form a TTI, and the TTI indexes in a sub-frame are respectively 0, 1, 2, 3, 4, 5 and 6 according to a time sequence. Then, when the PDSCH of the UE is on the TTI #3, the DMRS on the TTI #1 is used to perform demodulation. In an exemplary embodiment, when the eNB schedules the UE to perform transmission in a plurality of continuous TTIs, it may indicate to the UE whether the DMRS has been transmitted. For example, when a piece of DCI schedules a plurality of continuous TTIs, the TTI of transmitting the DMRS may be indicated in the DCI; or, each TTI in the continuous TTIs may correspond to a piece of DCI, and each piece of DCI indicates whether the DMRS is transmitted in the TTI.

In an alternative embodiment of the present disclosure, a design method of the reference signal is provided. The present embodiment is elaborated by taking the DMRS for example, and the presented method is not limited to being applied to the DMRS.

In a system supporting a short TTI, a sub-frame is divided into a plurality of TTIs, and each TTI occupies several symbols. For example, the short TTI is two symbols, and a sub-frame of the conventional CP may be divided into seven short TTIs. In practical applications, such a length of the short TTI does not form a limit, and the length may also be variable in a sub-frame.

All the DMRSs on the TTIs may be designed based on that there is the CRS, that is, the RE where the DMRS is should not occupy the RE where the CRS is. Here, the RE where the CRS is may be the RE occupied by the actual CRS in the system; for example, if the eNB has only two ports, namely the port #0 and the port #1, the DMRS is on the RE except the port #0 and the port #1. Or, the RE where the CRS is may also be determined according to a preset mode; for example, no matter what the actual CRS port is, the RE where the CRS is corresponds to the CRS of four ports. Or, when the CRS is a port (for example, the port #0), it may be assumed that the CRS is on the RE of two ports (for example, the port #0 and the port #1).

In an exemplary embodiment, the frequency-domain position of the DMRS is determined by at least one of the TTI index and the types of the TTI. For example, for a scenario of the conventional CP when the length of the TTI is 2, the frequency-domain positions of the DMRSs on the TTIs #1 and #6 are the same, but have a fixed offset with the frequency-domain positions of the DMRSs on the other TTIs. The types of the TTI include the TTI including the CRS and the TTI not including the CRS. There is a frequency offset between the frequency-domain positions of the DMRSs on the TTI including the CRS and the TTI not including the CRS.

In an exemplary embodiment, on the TTI including the CRS, if the RE corresponding to the DMRS is occupied by the CRS, the CRS eliminates the symbol on the DMRS, that is, when the RE corresponding to the DMRS is as same as the RE corresponding to the CRS, the CRS occupies the RE preferentially, as shown in FIG. 2. Or, for the TTI not including the CRS, the RE occupied by the DMRS ignores the position of the CRS, that is, the DMRS may occupy the RE corresponding to the subcarrier where the CRS is. For the TTI including the DMRS, the DMRS does not occupy the RE of the CRS, herein the RE of the CRS is as same as the above description.

Through the above description of the implementations, those skilled in the art may clearly know that the method according to the above embodiments may be implemented by means of software plus a necessary common hardware platform, certainly by means of hardware; but in many cases, the former is the better implementation. Based on this understanding, the technical solutions of the present disclosure substantially or the part making a contribution to the prior art may be embodied in the form of software product; the computer software product is stored in a storage medium (e.g. a Read Only Memory (ROM)/Random Access Memory (RAM), a magnetic disk, and a compact disc) and includes a number of instructions to make a terminal device (which may be a mobile phone, a computer, a server or a network device, etc.) perform the method in each embodiment of the present disclosure.

Second Embodiment

The present embodiment provides a device for transmitting information, which is configured to implement the above embodiments and preferred implementations. The embodiments which have been elaborated will not be repeated here. The term "module" used below can realize a combination of software and/or hardware with an intended function. Although the device described in the following embodiment is realized through software better, the realization through hardware or a combination of software and hardware is possible and conceived.

FIG. 12 is a structure diagram of a device for transmitting information according to an alternative embodiment of the present disclosure. As shown in FIG. 12, the device includes a determining module 122 and a transmitting module 124.

The determining module 122 is configured to determine, according to the predetermined mode and/or eNB configuration mode, at least one of the following: the PRG, the reference signal, and the frequency-domain resource allocation granularity.

The transmitting module 124 is connected to the determining module 122, and is configured to transmit information in the TTI.

In an exemplary embodiment, the numbers of RRBs corresponding to the PRG belong to a set, and each element in the set is equal to the integral multiple of the minimum value in the set. The set is obtained according to the predetermined mode or the eNB configuration mode, and the set is the same for all system bandwidths.

In an exemplary embodiment, modes of indicating the PRG according to eNB include one of the following: configuring through the SIB, configuring through the RRC signaling, and configuring through the DCI.

In an exemplary embodiment, the set is determined according to the length of the TTI. In an exemplary embodiment, the number of the PRBs corresponding to the PRG or the minimum value in the set is one of the following: one of the factors, except 1, of 12, and an integral multiple of one of the factors, except 1, of 12.

In an exemplary embodiment, the number of the PRBs corresponding to the frequency-domain resource allocation granularity is one of the following: an integral multiple of the number of the PRBs corresponding to the PRG, an integral multiple of a common multiple of the number of the PRBs corresponding to the PRG and the number of the PRBs corresponding to the RBG in the system, an integral multiple of the minimum value in the set, and an integral multiple of the common multiple of the minimum value in the set and the number of the PRBs corresponding to the RBG in the system.

In an exemplary embodiment, the PRG is determined according to one of the following modes: in the span of frequency-domain resource allocated to the UE, starting from the initial PRB, every m PRBs are one PRG; and in the frequency-domain resources allocated to the UE, starting from the initial PRB, every m PRBs are one PRG; herein the m is preset or configured by the eNB.

In an exemplary embodiment, on an OFDM symbol where the reference signal is, in the m continuous PRBs, for each layer of reference signal, one of every x REs is the reference signal, herein the x is one of the following:

an integral multiple of 3;

$$x = \left\lfloor \frac{12m-2}{n-1} \right\rfloor; x = \left\lfloor \frac{12m-1}{n-1} \right\rfloor,$$

where the function ⌊ ⌋ means rounding down, the m is a positive integer greater than 1, and the n and the x are positive integers.

In an exemplary embodiment, the n is the number of the REs corresponding to each layer of DMRS in the m continuous PRBs on the OFDM symbol.

In an exemplary embodiment, on the OFDM symbol where the reference signal is, and in the m continuous PRBs, the reference signal occupies at least one of the following: the RE with the lowest frequency in the PRG, or the RE with the lowest frequency, except the RE where the CRS is, in the PRG; the RE with the highest frequency in the PRG, or the RE with the highest frequency, except the RE where the CRS is, in the PRG.

In an exemplary embodiment, the value of the m is one of the following: the number of the PRBs corresponding to the PRG in the system, the minimum value in the set, the number of the PRBs corresponding to the RBG in the system, the preset value, the value configured by the eNB, and the number N of the PRBs corresponding to the frequency-domain span of transmitting the information; $\lfloor N/k \rfloor$, where the k is a preset positive integer or a positive integer configured by the eNB.

In an exemplary embodiment, the m continuous PRBs are one of the following: the PRG in the system, the PRG corresponding to the minimum value in the set, the RBG in the system, and the m continuous PRBs in the frequency-domain span of transmitting the information.

In an exemplary embodiment, the reference signal is transmitted in the specified TTI.

In an exemplary embodiment, the specified TTI satisfies at least one of the following conditions: the specified TTI does not include the CRS; the specified TTI satisfies $n_{TTI}$ mod a=b, wherein $n_{TTI}$ is a TTI index, the a is a positive integer greater than 1, the b is a nonnegative integer, and they are preset or notified by eNB. The specified TTI is the TTI of an odd number index or the TTI of an even number index. The specified TTI is the TTI in a Multicast/Broadcast Single Frequency Network (MBSFN). There is at least one symbol in the specified TTI not transmitting the PDCCH.

In an exemplary embodiment, the reference signal is transmitted on the symbol, which does not include the CRS, in the specified TTI.

In an exemplary embodiment, when the length of the TTI is 2, for the conventional CP, the TTI of transmitting the CRS is one of the following: the TTIs #1 and #3, the TTIs #1 and #4, the TTIs #1 and #5, the TTIs #1 and #6, the TTIs #2 and #4, the TTIs #2 and #5, the TTIs #2 and #6, the TTIs #3 and #5, the TTIs #3 and #6, the TTIs #4 and #6, and the TTIs #1, #3 and #5; wherein, in a sub-frame, every two symbols form one TTI, and the TTI indexes in a sub-frame are respectively 0, 1, 2, 3, 4, 5 and 6 according to a time sequence.

In an exemplary embodiment, when the length of the TTI is 2, for a non-MBSFN sub-frame of an extended CP, or an MBSFN sub-frame, the TTI of transmitting the CRS is one of the following: the TTIs #1 and #3, the TTIs #1 and #4, the TTIs #1 and #5, the TTIs #2 and #4, the TTIs #2 and #5, the TTIs #3 and #5, and the TTIs #1, #3 and #5; herein, in a sub-frame, every two symbols form one TTI, and the TTI indexes in a sub-frame are respectively 0, 1, 2, 3, 4 and 5 according to a time sequence.

In an exemplary embodiment, when the length of the TTI is 4 or 3, for the conventional CP, the TTI of transmitting the CRS is one of the following: the TTIs #1 and #3, the TTIs #0 and #2, and the TTIs #2 and #3; herein, in each time slot of a sub-frame, the first four symbols are one TTI, and the last three symbols are one TTI; or the first three symbols are one TTI, and the last four symbols are one TTI; the TTI indexes in a sub-frame are respectively 0, 1, 2 and 3 according to a time sequence.

In an exemplary embodiment, when the length of the TTI is 3, for the non-MBSFN sub-frame of the extended CP, or the MBSFN sub-frame, the TTI of transmitting the CRS is one of the following: the TTIs #1 and #3, the TTIs #0 and #2, and the TTIs #2 and #3; herein, in a sub-frame, every three symbols form one TTI, and the TTI indexes in a sub-frame are respectively 0, 1, 2 and 3 according to a time sequence.

In an exemplary embodiment, when the length of the TTI is 4, for the non-MBSFN sub-frame of the extended CP, or the MBSFN sub-frame, the TTI of transmitting the CRS is one of the following: the TTIs #1 and #2, the TTI #1, and the TTI #2; herein, in a sub-frame, every four symbols form one TTI, and the TTI indexes in a sub-frame are respectively 0, 1, and 2 according to a time sequence.

In an exemplary embodiment, the frequency-domain position of the reference signal is determined by at least one of a cell identity, the TTI index, or types of the TTI; herein the types of the TTI include the TTI including the CRS and the TTI not including the CRS.

In an exemplary embodiment, when the RE corresponding to the DMRS is as same as the RE corresponding to the CRS, the CRS occupies the RE preferentially.

It is to be noted that each of the above modules may be realized by software or hardware. For the latter, the each of the above modules may be realized by, but not limited to, the following way: all of the above modules are in the same processor; or, the above modules are respectively in different processors in form of any combination.

Third Embodiment

The embodiments of the present disclosure also provide a storage medium. In an exemplary embodiment, in the present embodiment, the storage medium may be set to store program codes for performing the following steps.

At S1, according to the predetermined mode and/or eNB configuration mode, at least one of the PRG, the reference signal, or the frequency-domain resource allocation granularity is determined.

At S2, information is transmitted in the TTI.

In an exemplary embodiment, in the present embodiment, the storage media include, but not limited to, a USB flash disk, an ROM, an RAM, a mobile hard disk, a magnetic disk, a compact disc, and other media capable of storing the program codes.

In the present embodiment, the processor performs, according to the program codes stored in the storage medium, the steps of the method recorded in the above embodiments.

In an exemplary embodiment, the specific examples in the present embodiment may refer to the examples described in the above embodiments and alternative embodiments.

It is apparent that those skilled in the art should appreciate that the above modules and steps of the present disclosure may be implemented by a general-purpose computing device, and they may be centralized in a single computing device or distributed on a network composed of multiple computing devices; optionally, they may be implemented by a program code which is capable of being executed by the computing device, so that they may be stored in a storage device and executed by the computing device; and in some situations, the presented or described steps may be executed in an order different from that described here; or they are made into integrated circuit modules, respectively; or multiple modules and steps of them are made into a single integrated circuit module to realize. Therefore the present disclosure is not limited to any particular combination of hardware and software.

The above is only the preferred embodiments of the present disclosure and not intended to limit the present disclosure; for those skilled in the art, the present disclosure may have various modifications and changes. Any modifications, equivalent replacements, improvements and the like within the principle of the present disclosure should fall within the protection scope of the claims of the present disclosure.

What is claimed is:

1. A method for transmitting information, comprising:
   determining, according to a predetermined mode and/or eNB configuration mode, a reference signal; and
   transmitting information in a Transmission Time Interval (TTI);
   wherein on one of Orthogonal Frequency Division Multiplexing (OFDM) symbols where the reference signal is, and in m continuous PRBs, for each layer of reference signal, one in every x continuous Resource Elements (RE) is the reference signal, wherein the x is one of the following:
   an integral multiple of 3;

$$x = \left\lfloor \frac{12m-2}{n-1} \right\rfloor; x = \left\lfloor \frac{12m-1}{n-1} \right\rfloor,$$

where $\lfloor \ \rfloor$ is a function of rounding down, m is a positive integer greater than 1, and n and x are positive integers, n is the number of the REs corresponding to each layer of Demodulation Reference Signal (DMRS) in the m continuous PRBs on the OFDM symbol.

2. The method as claimed in claim 1, wherein
   numbers of Physical Resource Blocks (RRB) corresponding to the PRG belong to a set; each element in the set is equal to an integral multiple of the minimum value in the set; wherein the set is obtained according to the predetermined mode or the eNB configuration mode, and the set is the same for all system bandwidths.

3. The method as claimed in claim 2, wherein the set is determined according to a length of the TTI.

4. The method as claimed in claim 1, wherein the eNB configuration modes comprise one of the following:
   configuring through a System Information Block (SIB), configuring through a Radio Resource Control (RRC) signaling, and configuring through a Downlink Control Information (DCI).

5. The method as claimed in claim 1, the number of the PRBs corresponding to the PRG or the minimum value in the set is one of the following:
   one of factors, except 1, of 12, and
   an integral multiple of one of the factors, except 1, of 12.

6. The method as claimed in claim 1, wherein the number of the PRBs corresponding to the frequency-domain resource allocation granularity is one of the following:
   an integral multiple of the number of the PRBs corresponding to the PRG;
   an integral multiple of a common multiple of the number of the PRBs corresponding to the PRG and the number of the PRBs corresponding to a Resource Block Group (RBG) in a system;
   an integral multiple of the minimum value in the set, and
   an integral multiple of the common multiple of the minimum value in the set and the number of the PRBs corresponding to the RBG in the system.

7. The method as claimed in claim 1, wherein the PRG is determined according to one of the following modes:
   in a span of frequency-domain resource allocated to a piece of User Equipment (UE), starting from an initial PRB, every m PRBs are one PRG; and
   in the frequency-domain resources allocated to the UE, starting from the initial PRB, every m PRBs are one PRG;
   wherein the m is a preset positive integer greater than 1, or is configured by the eNB.

8. The method as claimed in claim 1, wherein the value of the m is one of the following:
   the number of the PRBs corresponding to the PRG in the system, the minimum value in the set, the number of the PRBs corresponding to the RBG in the system, a preset value, a value configured by the eNB, and the number N of the PRBs corresponding to a frequency-domain span of transmitting the information; $\lfloor N/k \rfloor$, where k is a preset positive integer or a positive integer configured by the eNB.

9. The method as claimed in claim 1, wherein the m continuous PRBs are one of the following:
   the PRG in the system, the PRG corresponding to the minimum value in the set, the RBG in the system, and the m continuous PRBs in the frequency-domain span of transmitting the information.

10. The method as claimed in claim 1, wherein on the OFDM symbol where the reference signal is, and in the m continuous PRBs, the reference signal occupies at least one of the following:
    the RE with the lowest frequency in the m continuous PRBs, or the RE with the lowest frequency, except the RE where a Cell Reference Signal (CRS) is, in the m continuous PRBs;
    the RE with the highest frequency in the m continuous PRBs, or the RE with the highest frequency, except the RE where the CRS is, in the m continuous PRBs;
    wherein the m is a positive integer greater than 1.

11. The method as claimed in claim 1, wherein the reference signal is transmitted in a specified TTI.

12. The method as claimed in claim 11, wherein the specified TTI satisfies at least one of the following conditions:
    the specified TTI does not include the CRS;
    the specified TTI satisfies $n_{TTI}$ mod a=b, where $n_{TTI}$ is a TTI index, the a is a positive integer greater than 1, the b is a nonnegative integer, and they are preset or notified by eNB;
    the specified TTI is the TTI of an odd number index or the TTI of an even number index;
    the specified TTI is the TTI in a Multicast/Broadcast Single Frequency Network (MBSFN); and
    there is at least one symbol in the specified TTI not transmitting a Physical Downlink Control Channel (PDCCH).

13. The method as claimed in claim 12, wherein the CRS is the one when the number of ports is 4, or the one which is transmitted in an actual system.

14. The method as claimed in claim 11, wherein the reference signal is transmitted on the symbol, which does not include the CRS, in the specified TTI.

15. The method as claimed in claim 11, wherein when the length of the TTI is 2, for a conventional CP, the TTI of transmitting the CRS is one of the following:
    the TTIs #1 and #3, the TTIs #1 and #4, the TTIs #1 and #5, the TTIs #1 and #6, the TTIs #2 and #4, the TTIs #2 and #5, the TTIs #2 and #6, the TTIs #3 and #5, the TTIs #3 and #6, the TTIs #4 and #6, and the TTIs #1, #3 and #5;

wherein, in a sub-frame, every two symbols form one TTI, and the TTI indexes in a sub-frame are respectively 0, 1, 2, 3, 4, 5 and 6 according to a time sequence;

or when the length of the TTI is 2, for the conventional CP, the TTI of transmitting the reference signal is one of the following:

the TTIs #1 and #3, the TTIs #1 and #4, the TTIs #1 and #5, the TTIs #1 and #6, the TTIs #2 and #4, the TTIs #2 and #5, the TTIs #2 and #6, the TTIs #3 and #5, the TTIs #3 and #6, the TTIs #4 and #6, the TTIs #1, #3 and #5, the TTI #1, 4 and 6, and the TTI #2, 4 and 6;

wherein, in a sub-frame, every two symbols form one TTI, and the TTI indexes in a sub-frame are respectively 0, 1, 2, 3, 4, 5 and 6 according to a time sequence;

or when the length of the TTI is 2, for a non-MBSFN sub-frame of an extended CP, or an MBSFN sub-frame, the TTI of transmitting the reference signal is one of the following:

the TTIs #1 and #3, the TTIs #1 and #4, the TTIs #1 and #5, the TTIs #2 and #4, the TTIs #2 and #5, the TTIs #3 and #5, and the TTIs #1, #3 and #5;

wherein, in a sub-frame, every two symbols form one TTI, and the TTI indexes in a sub-frame are respectively 0, 1, 2, 3, 4 and 5 according to a time sequence;

or when the length of the TTI is 4 or 3, for the conventional CP, the TTI of transmitting the reference signal is one of the following:

the TTIs #1 and #3, the TTIs #0 and #2, and the TTIs #2 and #3;

wherein, in each time slot of a sub-frame, the first four symbols are one TTI, and the last three symbols are one TTI; or the first three symbols are one TTI, and the last four symbols are one TTI; the TTI indexes in a sub-frame are respectively 0, 1, 2 and 3 according to a time sequence;

or when the length of the TTI is 3, for a non-MBSFN sub-frame of an extended CP, or an MBSFN sub-frame, the TTI of transmitting the reference signal is one of the following:

the TTIs #1 and #3, the TTIs #0 and #2, and the TTIs #2 and #3;

wherein, in a sub-frame, every three symbols form one TTI, and the TTI indexes in a sub-frame are respectively 0, 1, 2 and 3 according to a time sequence;

or when the length of the TTI is 4, for a non-MBSFN sub-frame of an extended CP, or an MBSFN sub-frame, the TTI of transmitting the reference signal is one of the following:

the TTIs #1 and #2, the TTI #1, and the TTI #2;

wherein, in a sub-frame, every four symbols form one TTI, and the TTI indexes in a sub-frame are respectively 0, 1, and 2 according to a time sequence.

16. The method as claimed in claim 11, wherein the reference signal corresponding to the information is transmitted in the specified TTI which is before and closest to the TTI.

17. The method as claimed in claim 1, wherein a frequency-domain position of the reference signal is determined by at least one of the following:

a cell identity, the TTI index, or types of the TTI; wherein the types of the TTI comprise the TTI including the CRS and the TTI not including the CRS.

18. The method as claimed in claim 1, further comprising:

when the RE corresponding to the reference signal is as same as the RE corresponding to the CRS, the CRS occupies the RE preferentially.

19. A device for transmitting information, comprising:

a determining module, which is configured to determine, according to a predetermined mode and/or eNB configuration mode, a reference signal; and a transmitting module, which is configured to transmit information in a Transmission Time Interval (TTI);

wherein on one of Orthogonal Frequency Division Multiplexing (OFDM) symbols where the reference signal is, and in m continuous PRBs, for each layer of reference signal, one in every x continuous Resource Elements (RE) is the reference signal, wherein the x is one of the following:

an integral multiple of 3;

$$x = \left\lfloor \frac{12m-2}{n-1} \right\rfloor; x = \left\lfloor \frac{12m-1}{n-1} \right\rfloor,$$

where $\lfloor \ \rfloor$ is a function of rounding down, m is a positive integer greater than 1, and n and x are positive integers, n is the number of the REs corresponding to each layer of Demodulation Reference Signal (DMRS) in the m continuous PRBs on the OFDM symbol.

* * * * *